United States Patent
Hsu et al.

(10) Patent No.: US 10,971,736 B2
(45) Date of Patent: Apr. 6, 2021

(54) ELECTRODE SEPARATOR STRUCTURE AND FUEL CELL APPLIED WITH THE SAME

(71) Applicant: INDUSTRIAL TECHNOLOGY RESEARCH INSTITUTE, Hsinchu (TW)

(72) Inventors: Ying-Ying Hsu, Kaohsiung (TW); Cheng-Hung San, Xinpu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 181 days.

(21) Appl. No.: 16/234,113

(22) Filed: Dec. 27, 2018

(65) Prior Publication Data
US 2020/0203736 A1    Jun. 25, 2020

(30) Foreign Application Priority Data
Dec. 25, 2018    (TW) ................... 107146996

(51) Int. Cl.
*H01M 8/0258*    (2016.01)
*H01M 8/1004*    (2016.01)
(Continued)

(52) U.S. Cl.
CPC ....... *H01M 8/0258* (2013.01); *H01M 8/0232* (2013.01); *H01M 8/1004* (2013.01); *H01M 2008/1095* (2013.01)

(58) Field of Classification Search
CPC ............. H01M 8/0232; H01M 8/0258; H01M 8/1004; H01M 2008/1095
See application file for complete search history.

(56) References Cited

U.S. PATENT DOCUMENTS

| 2011/0076596 A1 | 3/2011 | Futami et al. |
| 2013/0149633 A1 | 6/2013 | Jeong |

(Continued)

FOREIGN PATENT DOCUMENTS

| CN | 101602530 A | 12/2009 |
| CN | 102244270 A | 11/2011 |

(Continued)

OTHER PUBLICATIONS

Kim et al. "Modeling two-phase flow in three-dimensional complex flow-fields of proton exchange membrane fuel cells", Journal of Power Sources, 365, (2017), p. 419-429.

(Continued)

*Primary Examiner* — Brittany L Raymond
(74) *Attorney, Agent, or Firm* — Birch, Stewart, Kolasch & Birch, LLP

(57) ABSTRACT

An electrode separator structure includes a conductive gas-resistant plate and a conductive porous structure. The conductive gas-resistant plate has a receiving space and at least a set of an inlet port and an outlet port, wherein the inlet port and the outlet port have passages communicating the receiving space. The conductive porous structure is disposed in the receiving space and communicates with the set of the inlet port and the outlet port to form reaction gas flow paths, wherein the conductive porous structure includes plural holes laminated as at least two porous layers, and the at least two porous layers are laminated in a staggered arrangement along a direction vertical to an extending plane of the conductive porous structure.

10 Claims, 11 Drawing Sheets

(51) Int. Cl.
*H01M 8/0232* (2016.01)
*H01M 8/1018* (2016.01)

(56) References Cited

U.S. PATENT DOCUMENTS

2014/0154604 A1    6/2014  Brett et al.
2016/0141639 A1*   5/2016  Nakaji .............. H01M 8/04291
                                                          429/482
2017/0346103 A1   11/2017  Badrinarayanan et al.

FOREIGN PATENT DOCUMENTS

| CN | 103503213 A | 1/2014 |
| CN | 105591121 A | 5/2016 |
| JP | 2008-108573 A | 5/2008 |
| TW | I246792 B | 1/2006 |
| TW | 201130190 A | 9/2011 |
| TW | M579825 U | 6/2019 |

OTHER PUBLICATIONS

Taiwanese Office Action and Search Report for Taiwanese Application No. 107146996, dated Jul. 30, 2019.

* cited by examiner

ELECTRODE SEPARATOR STRUCTURE AND FUEL CELL APPLIED WITH THE SAME

This application claims the benefit of Taiwan application Serial No. 107146996, filed Dec. 25, 2018, the disclosure of which is incorporated by reference herein in its entirety.

TECHNICAL FIELD

The disclosure relates in general to an electrode separator structure, and more particularly to an electrode separator structure applied in a fuel cell.

BACKGROUND

A fuel cell is an electrochemical cell that converts the chemical energy from a fuel into electricity through an electrochemical reaction. A redox reaction is mainly carried out by oxygen or other oxidant to convert the chemical energy from the fuel into the electrical energy. The most common fuel for the fuel cell is hydrogen, and other fuel sources come from any hydrocarbon that decomposes hydrogen, such as natural gas, alcohol, and methane. Unlike a typical battery (the chemical energy comes from chemicals already present in the battery) being discarded as usual, the fuel cell has the advantage that produces electricity continuously and stably as long as the oxygen and fuel sources are continuously supplied. The fuel source for the fuel cell can be supplied from a renewable source, which will not cause environmental pollution. Therefore, the fuel cell is a green source energy that is environmental friendly.

There are many types of fuel cells, but they all consist of an anode, a cathode, and an electrolyte that allows positively charged hydrogen ions (protons) to move between the two sides of the fuel cell. At the anode a catalyst causes the fuel to undergo oxidation reactions that generate protons (positively charged hydrogen ions) and electrons. The protons flow from the anode to the cathode through the electrolyte after the reaction. At the same time, electrons are drawn from the anode to the cathode through an external circuit, producing direct current electricity. Fuel cells can be classified by the type of electrolyte they use and by the difference in startup time. Also, a single cell produce relatively small electrical potentials, about 0.7 volts, and it is common that several cells are stacked in series to yield higher voltage, to create sufficient voltage to meet the requirements of the applications.

Proton exchange membrane fuel cell (PEMFC) is one type of fuel cells, which generates electricity and heat by using a hydrogen-containing fuel and air. PEMFC is operated at a relative low temperature (such as in a range of 50° C. to 100° C.) and at atmospheric pressure, and contains a special proton-conducting polymer electrolyte membrane. Also, the fuel cell does not use any chemical liquid, and produces pure water and heat after power generation; therefore, it is not harmful to the human body and is also environmental friendly. The fuel cell is suitable for daily life, for example, it can be applied to daily transportation, field equipment, or portable device as power supply.

In a proton exchange membrane fuel cell (PEMFC), a stream of hydrogen is delivered to the anode side of the membrane electrode assemblies (MEA) through the plate with channels, and reaches the catalyst layer at the anode side via the gas diffusion layer. At the anode side, hydrogen is catalytically split into hydrogen ions (i.e. protons) and electrons. The anode reaction (also known as oxidation half-cell reaction) is represented as below.

Anode reaction: $H_2 \rightarrow 2H^+ + 2e^-$

Then, the hydrogen ions (i.e. protons) permeate through the polymer electrolyte membrane to the cathode side. The electrons travel along an external load circuit to the cathode side of the MEA, thus creating the current output of the fuel cell. Meanwhile, a stream of oxygen is delivered to the cathode side of the MEA. At the cathode side oxygen molecules react with the protons permeating through the polymer electrolyte membrane and the electrons arriving through the external circuit to form water molecules. The cathode reaction (also known as reduction half-cell reaction) can be expressed as below.

Cathode reaction: $\frac{1}{2}O_2 + 2H^+ + 2e^- \rightarrow H_2O$

Overall reaction for a fuel cell can be expressed as follows:

$H_2 + \frac{1}{2}O_2 \rightarrow H_2O$

However, if the water produced by the reaction as described above cannot be eliminated quickly, it will affect the electrochemical reaction of the proton exchange membrane fuel cell, and limit the discharge performance of the fuel cell.

SUMMARY

The disclosure is directed to an electrode separator structure and a fuel cell applied with the same.

According to one embodiment, an electrode separator structure is provided, comprising a conductive gas-resistant plate and a conductive porous structure. The conductive gas-resistant plate has a receiving space and at least a set of an inlet port and an outlet port, wherein at least the set of the inlet port and the outlet port have passages respectively communicating the receiving space. The conductive porous structure is disposed in the receiving space and communicates with at least the set of the inlet port and the outlet port to form reaction gas flow paths, wherein the conductive porous structure comprises a plurality of holes laminated as at least two porous layers, and the at least two porous layers are laminated in a staggered arrangement along a direction vertical to an extending plane of the conductive porous structure.

According to another embodiment, a fuel cell, comprising an anode electrode separator plate, a cathode electrode separator plate and a membrane electrode assembly disposed between the anode electrode separator plate and the cathode electrode separator plate, is provided, wherein the cathode electrode separator plate comprises the aforementioned electrode separator structure.

Figure 1:
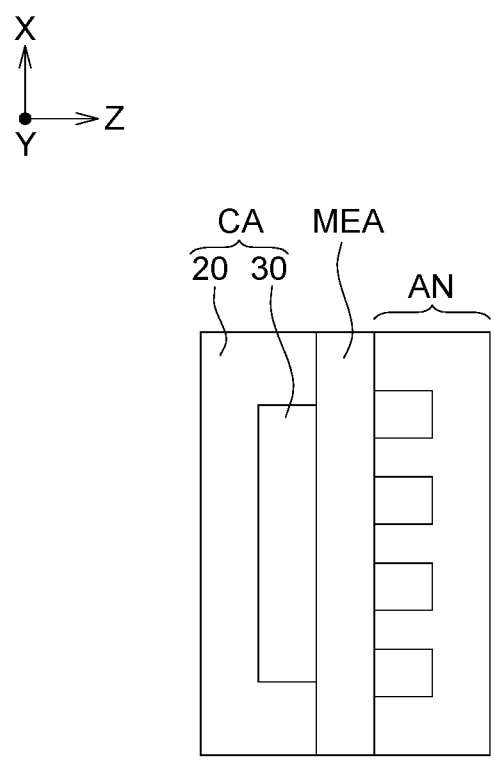
FIG. 1 is a schematic diagram of a single cell of a fuel cell applied with an electrode separator structure according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the embodiment of the disclosure, an electrode separator structure and a fuel cell applied with the same are provided. The electrode separator structure of the embodiment can be applied to a cathode electrode separator plate of the fuel cell, such as a proton exchange membrane fuel cell (PEMFC), for improving the mass transfer of the cathode reactants and decreasing the impacts of water contents on the electrochemical reaction of the proton exchange membrane. In one embodiment, a convention bipolar plate of a fuel cell, particularly the rib-channel structure at a cathode electrode separator plate, is replaced by a conductive porous structure of the embodiment to provide the flow paths for reactant gases. The electrode separator structure of the embodiment can be applied to a cathode electrode separator plate of the fuel cell to improve the exchange rate of oxygen and remove water generated within the flow paths at the cathode side during electrochemical reaction, thereby preventing undesired flooding. Compared to a structure having conventional serpentine channel, the electrode separator structure of the embodiment does increase the current density and improve the electrochemical reaction of the fuel cell in the application.

The embodiments are described in details with reference to the accompanying drawings for illustrating an electrode separator structure and a fuel cell applied with the electrode separator structure of the disclosure. One basic unit of a fuel cell, a single cell, is depicted herein as an example, that is, a membrane electrode assembly (MEA) is disposed between two electrode separator plates, and several basic units are assembled to form a cell stack. Assembly of several cell stacks constitutes a fuel cell power generation device.

The details of the structures, arrangements of the components and fabricating method of the structures of the embodiments are provided for exemplification, and the described details of the embodiments are not intended to limit the present disclosure. It is noted that not all embodiments of the disclosure are shown. Combinations of the exemplified examples are also applicable. Modifications and variations can be made without departing from the spirit of the disclosure to meet the requirements of the practical applications. Thus, there may be other embodiments of the present disclosure or applications which are not specifically illustrated. Further, the experiments and results thereof disclosed herein are merely some examples of the embodiments of the disclosure, which are provided for exemplifying the properties and application effects of the electrode separator structures of the embodiments, and not provided for limiting the claim scopes of the present disclosure. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense.

Moreover, ordinal numbers, such as "the first", "the second", and "the third", are used in the specification and claims to modify the components of the claims. The ordinal numbers of claim components do not imply or represent that the said components have any previous ordinal numbers, nor represent the sequence between a particular claim component and another claim component or the sequence of process in a manufacturing method. The ordinal numbers used to clearly distinguish the claim components having the same designations. Additionally, the spatial terms such as "beneath", "below", "lower", "above", "upper", or the likes in the specification and claims are used to describe the spatial relationship between one element or feature and another element or feature as illustrated. Accordingly, it will be apparent to those skilled in the art that those spatially-related terms include not only the orientation of the elements as shown in the figures, but also the orientations of the elements in the use or operation. Thus, those terms in the specification and claims are provided for illustrating the embodiments and are not intended to limit the scopes of the disclosure.

FIG. 1 is a schematic diagram of a single cell of a fuel cell applied with an electrode separator structure according to one embodiment of the disclosure. As shown in FIG. 1, a single cell of a fuel cell includes an anode electrode separator plate AN, a cathode electrode separator plate CA and a membrane electrode assembly MEA disposed between the anode electrode separator plate AN and the cathode electrode separator plate CA. The anode electrode separator plate AN and the cathode electrode separator plate CA constitute a bipolar plate (also known as separator plate). Take a proton exchange membrane fuel cell (PEMFC) for example, the main electrochemical reactions of a fuel cell occur in a membrane electrode assembly (MEA) consisting of a proton exchange membrane (PEM) sandwiched between an anode electrode and a cathode electrode. Each of the anode electrode and the cathode electrode includes a gas diffusion layer (in which reactants diffuse uniformly to reach catalyst) and a catalyst layer (catalyzing electrochemical reaction). The proton exchange membrane is a solid polymer having a network structure inside with high microporosity, and the network structure provides channels in atomic scale. The proton exchange membrane isolates the reactants to avoid the mixing of the gases from two electrode sides, wherein the mixture of the reactants would cause the short circuit and decrease the performance of the cell. The proton exchange membrane allows positively charged hydrogen ions (protons) generated at anode to pass through it to the cathode, and it does not allow the pass of the negative charged electrons to prevent short circuit. The negative charged electrons must travel along an external circuit to the cathode, creating an electrical current. Also, a cathode electrode separator plate CA and an anode electrode separator plate AN, which form a bipolar plate, are disposed respectively at outsides of the cathode electrode and the anode electrode, and provides good sealing to separate the oxidant from the reducing agent, and also collect the generated current. Also, the reaction gas can be uniformly transported to the electrode by the gas flow paths (conventional bipolar plate is typically a graphite or surface-modified metal plate with gas flow paths such as channels in parallel or a serpentine channel for gas flow). An electrode separator structure of the embodiment can be applied to a bipolar plate of a fuel cell, such as functioning as the cathode electrode separator plate CA in FIG. 1. In one example, a cathode electrode separator plate CA includes a conductive gas-resistant plate 20 and a conductive porous structure 30.

Figure 2A:
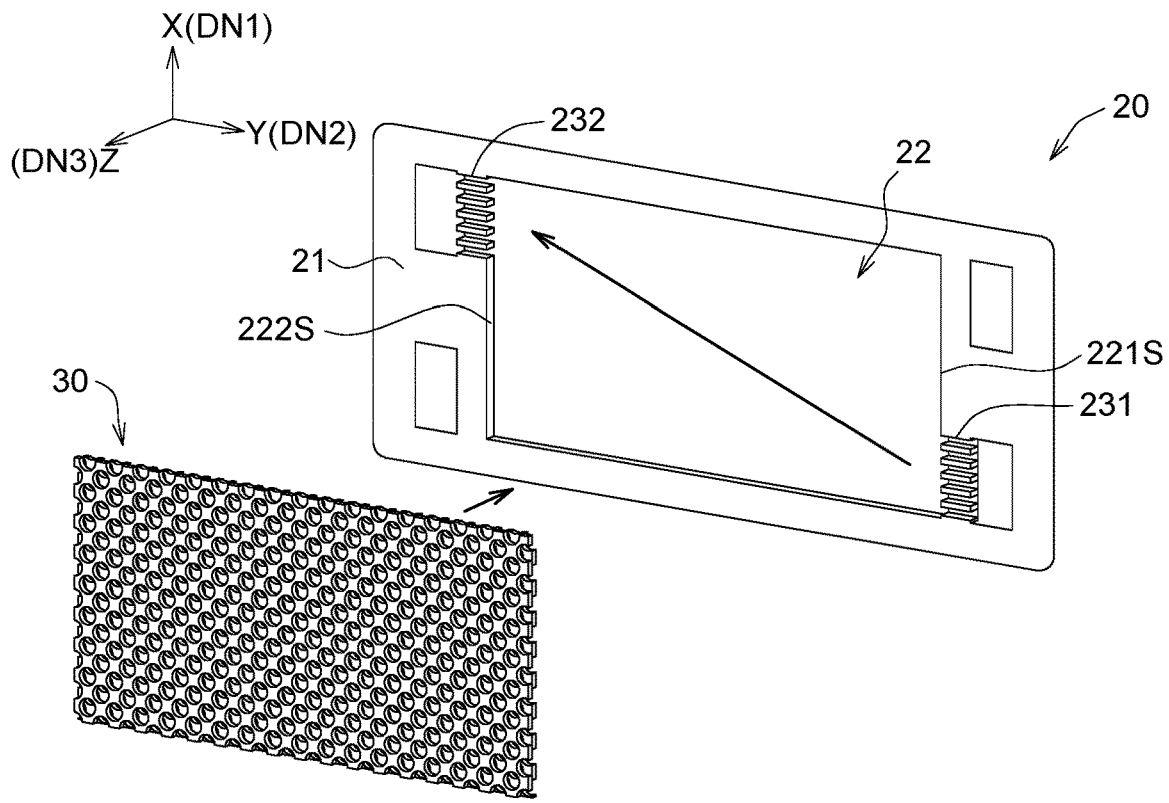
FIG. 2A is schematic diagram of an electrode separator structure according to one embodiment of the disclosure.

FIG. 2A is schematic diagram of an electrode separator structure according to one embodiment of the disclosure. In one embodiment, an electrode separator structure includes a conductive gas-resistant plate 20 and a conductive porous structure 30. The conductive gas-resistant plate 20 include a body 21 and a space (such as a dish-shaped region) for receiving the conductive porous structure 30; that is, the conductive porous structure 30 is disposed within the receiving space 22. As shown in FIG. 2A, the conductive gas-resistant plate 20 has a receiving space 22 and at least one set of an inlet port and an outlet port (such as including one or more inlet ports 231 and one or more outlet ports 232 disposed at the body 21), wherein the set of the inlet port and the outlet port have passages respectively communicating the receiving space 22. As shown in FIG. 2A, the inlet ports 231 and the outlet ports 232 respectively connect two opposite sides 221S and 222S of the receiving space 22, thereby communicating with the conductive porous structure 30 disposed within the receiving space 22 to form the flow paths of the reaction gases.

The conductive gas-resistant plate 30 of the embodiment can be made of, for example, a conductive material that is able to block gas penetration, wherein a dish-shaped region thereof can be built by any suitable processing method. Material examples of the conductive gas-resistant plate 30 include titanium, stainless steel and other applicable metal materials. It is known that more than one set of the inlet port(s) and the outlet port(s) can be built for the conductive gas-resistant plate of the embodiment. Also, the inlet ports and the outlet ports can be positioned at any two sides of the receiving space 22.

Figure 2B:
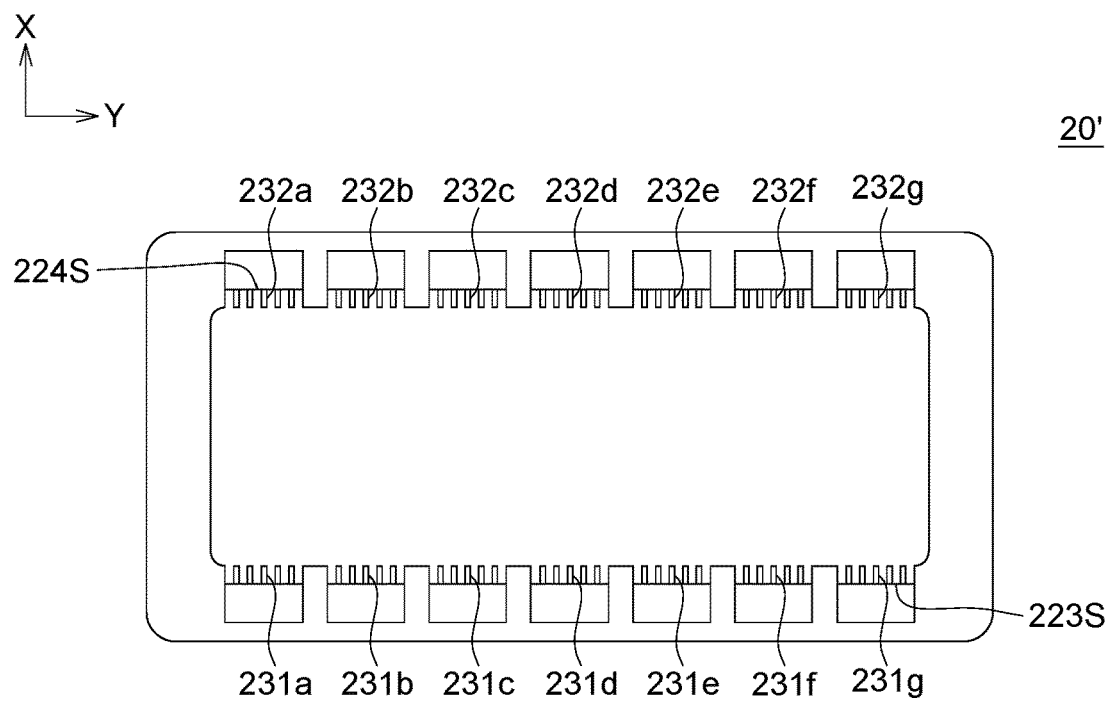
FIG. 2B shows another conductive gas-resistant plate of an electrode separator structure according to one embodiment of the disclosure.

FIG. 2B shows another conductive gas-resistant plate of an electrode separator structure according to one embodiment of the disclosure. Another conductive gas-resistant plate 20' of the embodiment may include several sets of the inlet ports and the outlet ports connecting to the receiving space 22, wherein those sets of the inlet ports and the outlet ports have passages respectively communicating the receiving space of the conductive porous structure 30 to form the flow paths of the reaction gases. As shown in FIG. 2B, several sets of the inlet ports and the outlet ports, for example, consist of several inlet ports 231$a$-231$g$ and several outlet ports 232$a$-232$g$, wherein these sets of the inlet ports and the outlet ports have passages and respectively connect two opposite sides 223S and 224S of the receiving space 22, thereby communicating with the conductive porous structure 30 disposed within the receiving space 22. Therefore, the positions, the quantity and the sizes of the inlet ports and the outlet ports communicating the receiving space 22 can be optionally designed as long as the demand for distributing the reaction gas can be achieved.

Figure 3A:
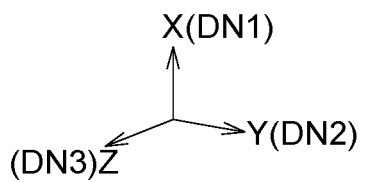
FIG. 3A shows a conductive porous structure of an electrode separator structure according to one embodiment of the disclosure.
Figure 3A:
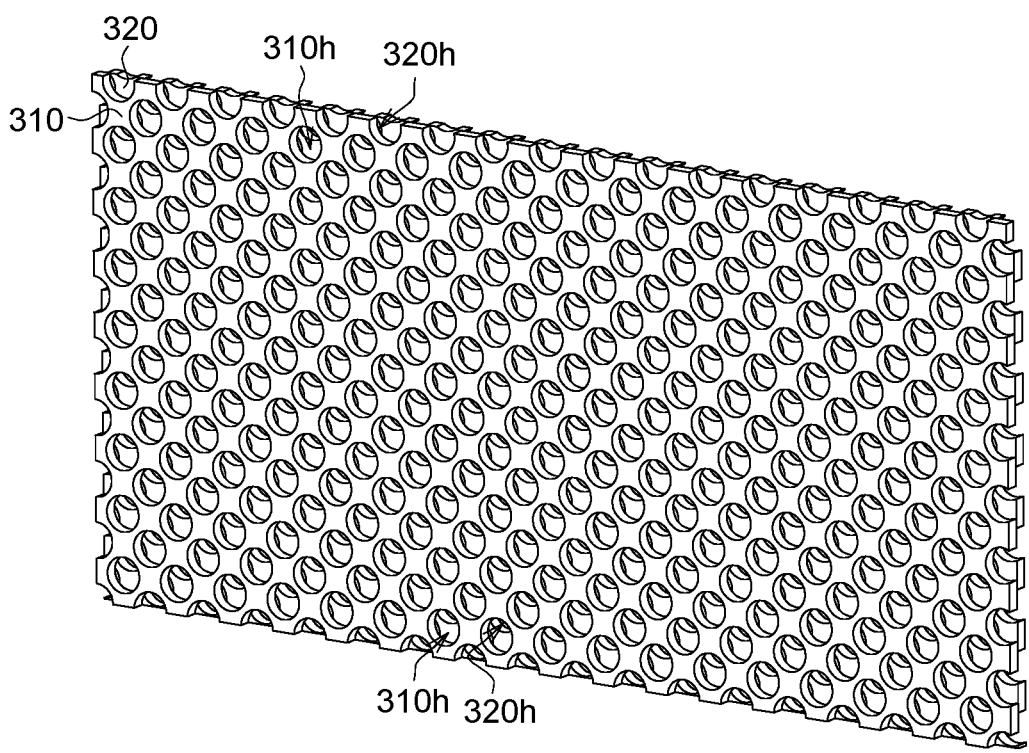
Figure 3B:
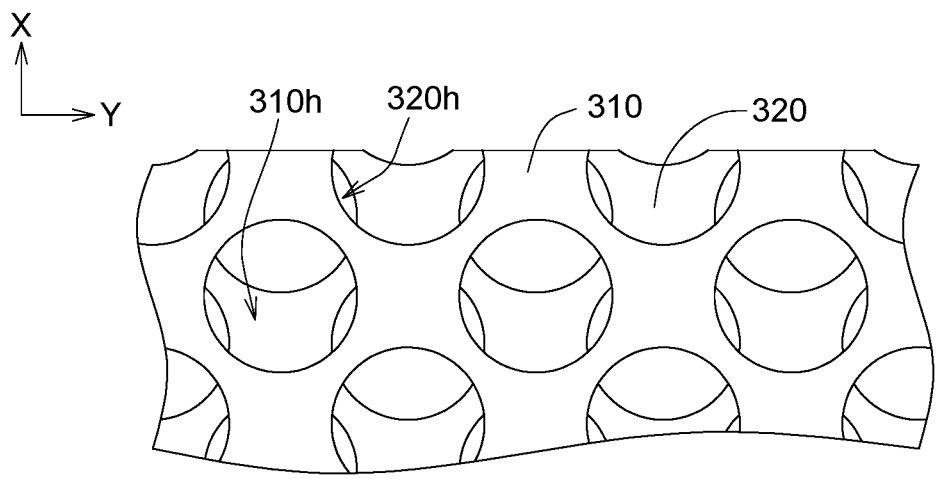
FIG. 3B is a top views showing parts of the holes of the conductive porous structure in FIG. 3A.

FIG. 3A shows a conductive porous structure of an electrode separator structure according to one embodiment of the disclosure. FIG. 3B is a top views showing parts of the holes of the conductive porous structure in FIG. 3A. Please refer to FIG. 2A, FIG. 3A and FIG. 3B. In one embodiment, the conductive porous structure 30 comprises a plurality of holes, and the conductive porous structure 30 extends along a plane (such as XY-plane) defined by the first direction DN1 (such as X-direction) and the second direction DN2 (such as Y-direction). If the conductive porous structure 30 of FIG. 3A is applied to a single cell as shown in FIG. 1, an extending plane of the conductive porous structure 30 is parallel to an extending plane of the membrane electrode assembly MEA. According to one embodiment, the holes of the conductive porous structure 30 are periodically and repeatedly arranged to form an array, as shown in FIG. 3A. Also, the holes of the conductive porous structure 30 are laminated as at least two porous layers according to the positions of the holes. The at least two porous layers are laminated in a staggered arrangement along a direction (the third direction DN3 such as Z-direction in FIG. 3A) vertical to an extending plane (such as XY-plane) of the conductive porous structure 30. In one example, an extending plane of the receiving space 22 would be in parallel to the extending plane of the conductive porous structure 30, so that the two or more porous layers can be regarded as being laminated in a staggered arrangement along a direction vertical to an extending plane of the receiving space 22. Also, in one embodiment, the third direction DN3 is perpendicular to the first direction DN1 and the second direction DN2. The holes of the upper and lower porous layers are communicated with each other to form the flow paths of the reaction gases. Therefore, the staggered arrangement between the holes of different porous layers allows a gas to flow upwardly and downwardly along the direction (such as Z-direction) vertical to the extending plane of the conductive porous structure 30. When an electrode separator structure of the embodiment is applied to a cathode electrode separator plate CA of the fuel cell shown in in FIG. 1, a gas penetrates and flows along a direction vertical to an extending plane of a reaction surface through the staggered holes of different porous layers, thereby improving the exchange rate of oxygen and the removal of product water at the cathode side during electrochemical reaction. According to one application, the reaction surface of the membrane electrode assembly MEA, which an electrochemical reaction occurs, may be parallel to an extending plane (such as XY-plane) of the conductive porous structure 30 in FIG. 3A.

As shown in FIG. 3A and FIG. 3B, the holes of the conductive porous structure 30 can be regarded as at least two porous layers. That is, the conductive porous structure 30 comprises a first porous layer 310 and a second porous layer 320. The first porous layer 310 includes several first holes 310$h$, wherein those first holes 310$h$ are periodically and repeatedly arranged to form an array in parallel to the extending plane (such as XY-plane) of the conductive porous structure 30. Similarly, the second porous layer 320 includes several second holes 320$h$, wherein those second holes 320$h$ are periodically and repeatedly arranged to form an array in parallel to the extending plane (such as XY-plane) of the conductive porous structure 30. Also, the centers of the holes in different porous layers are mutually staggered along a direction (such as Z-direction in FIG. 3A) vertical to an extending plane (such as XY-plane) of the conductive porous structure 30. In one example, it is assumed that two holes positioned in different porous layers are partially overlapped and communicated with each other, wherein the two holes are staggered from each other by a central misalignment distance d, and one of the holes has a maximum dimension D (for example, a diameter D), the central misalignment distance d between the two holes can be no less than 0.5D but smaller than D (i.e. 0.5D≤d<D) according to the staggered arrangement.

Figure 3C:
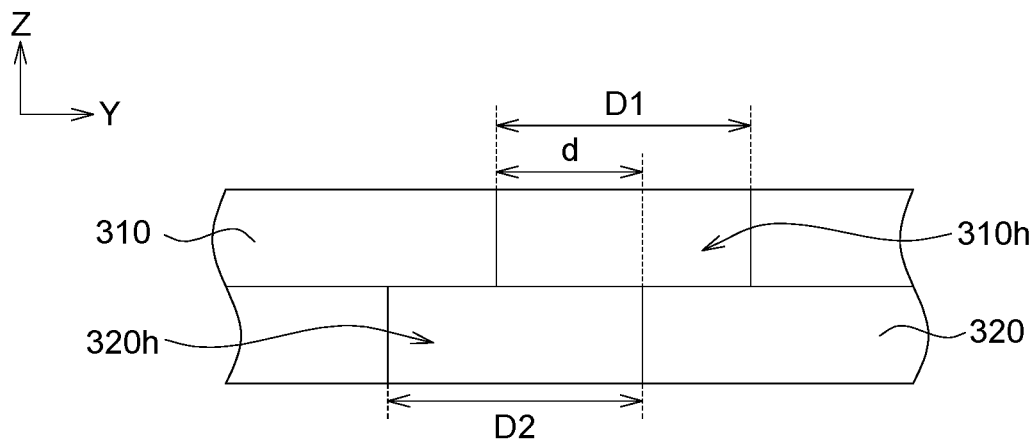
FIG. 3C is a cross-sectional view of adjacent two holes respectively in upper and lower porous layers of the conductive porous structure in FIG. 3A.

FIG. 3C is a cross-sectional view of adjacent two holes respectively in upper and lower porous layers of the conductive porous structure in FIG. 3A. If the first holes 310$h$ and the second holes 320$h$ as exemplified have the circular shapes, a diameter of one of the first holes 310$h$ and the second holes 320$h$ can be regarded as the maximum dimension D of the hole. As shown in FIG. 3C, the first hole 310$h$ and the second hole 320$h$ have the first diameter D1 and the second diameter D2, respectively. The centers of the first hole 310$h$ and the second hole 320$h$ are misaligned at a distance d, which is so-called as a central misalignment distance d, wherein 0.5D1≤d<D1 and/or 0.5D2≤d<D2.

Moreover, in one embodiment, a porosity of the conductive porous structure 30 is in a range of 30% to 80%. In one example, an average diameter of the holes of the conductive porous structure 30 is in a range of 0.1 mm to 1.0 mm. In one example, a pitch between two adjacent holes in the same porous layer (such as two of the first holes 310$h$ positioned adjacently or two of the second holes 320$h$ positioned adjacently) is in a range of 0.5 mm to 3 mm. In one example, each porous layer (such as the first porous layer 310 or the second porous layer 320) of the conductive porous structure 30 has a thickness ranged from 0.05 mm to 0.6 mm. Additionally, those numerical values as described herein are provided for exemplification, not for limiting the scope of the disclosure.

It is noted that in the two (or more than two) porous layers as laminated, the holes in different porous layers may have the same shape or different shapes. Also, the holes in the same porous layer may have the same shape or different shapes. Furthermore, the holes in different porous layers may have the same size or different sizes, and the holes in the same porous layer may have the same size or different sizes. In this example, the first holes 310$h$ and the second holes 320$h$ have circular shapes, and the first diameter D1 of the first holes 310$h$ is equal to the second diameter D2 of the second holes 320$h$ (i.e. D1=D2), as shown in FIG. 3A-FIG. 3C. However, the disclosure adopted in the practical applications is not limited to the configurations (such as shapes, sizes, etc) of the conductive porous structures exemplified in the embodiments.

Figure 3D:
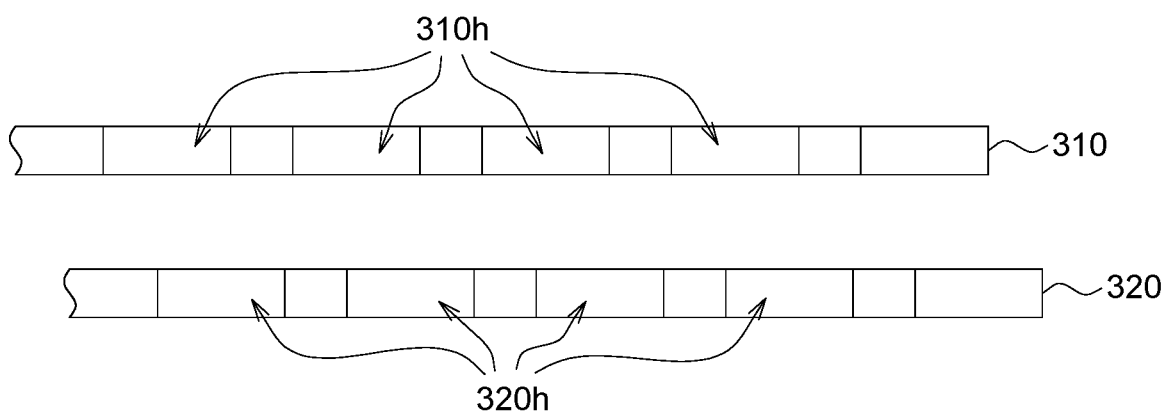
FIG. 3D is a cross-sectional view showing parts of the holes in the upper and lower porous layers of the conductive porous structure in FIG. 3A.

Furthermore, the conductive porous structure 30 of the embodiment can be an integrally formed single piece; alternatively, it can also comprise two or more units assembled to each other as a combination. FIG. 3D is a cross-sectional view showing parts of the holes in the upper and lower porous layers of the conductive porous structure in FIG. 3A. As shown in FIG. 3D, two individual units (such as the first porous layer 310 and the second porous layer 320) are depicted, wherein they are assembled to each other to form the conductive porous structure 30 in FIG. 3A.

Figure 4A:
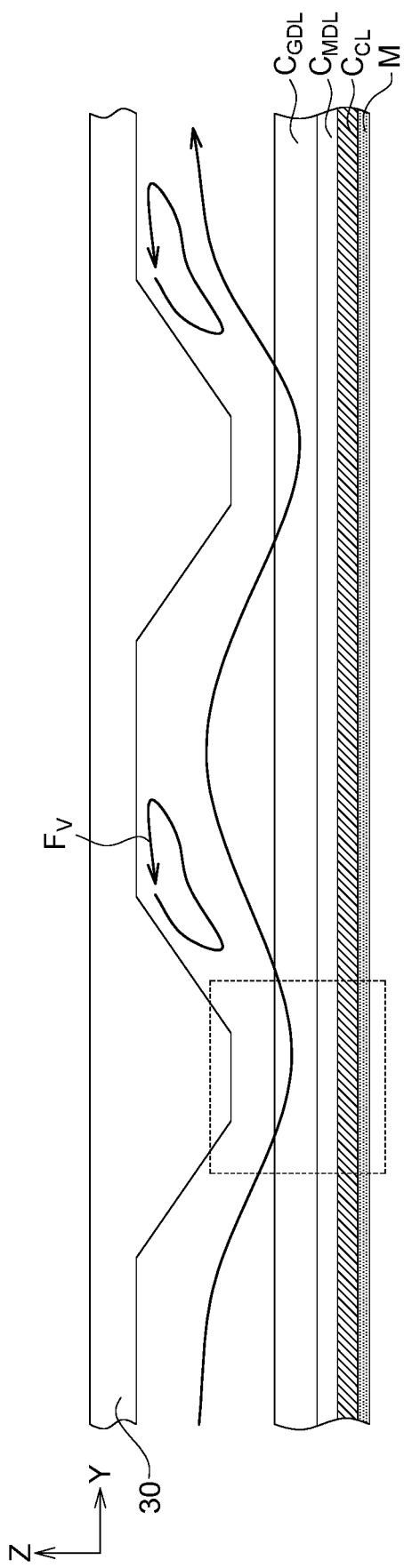
FIG. 4A is a micro-schematic diagram showing gas flow in a cathode electrode of a fuel cell.
Figure 4B:
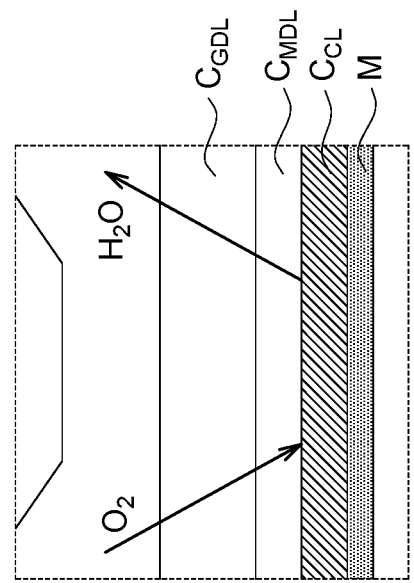
FIG. 4B is an enlarged view of parts of the structure in FIG. 4A.

FIG. 4A is a micro-schematic diagram showing gas flow in a cathode electrode of a fuel cell. FIG. 4B is an enlarged view of parts of the structure in FIG. 4A. FIG. 4A and FIG. 4B depict a configuration of a cathode side of a fuel cell, including a proton exchange membrane M, a catalyst layer $C_{CL}$, a micro porous layer $C_{MPL}$ and a gas diffusion layer $C_{DL}$. It is known that a fuel cell comprises an anode side, that may also comprise another catalyst layer, another micro porous layer, and another gas diffusion layer disposed at the other side of the proton exchange membrane M (not depicted in FIG. 4A and FIG. 4B). The electrochemical reaction of the fuel cell is described below. A stream of hydrogen is delivered to the catalyst layer by the gas diffusion layer at the anode side, and the catalyst layer catalytically splits hydrogen into protons (H+) and electrons (e−). The protons (H+) passes through the proton exchange membrane M to the catalyst layer $C_{CL}$ at the cathode side, meanwhile the electrons (e−) travel along an external circuit to the catalyst layer $C_{CL}$ at the cathode side. The hydrogen protons and electrons together with the oxygen (diffused from the gas diffusion layer $C_{GDL}$ to the catalyst layer $C_{CL}$ at the cathode side) generate water. The turbulences (such as the turbulence $F_v$ shown in FIG. 4B) generated by the flow of gas passing through the irregular slits will increases the flow vector perpendicular to an extending direction of the gas diffusion layer $C_{GDL}$ (for example, the Z direction), thereby promoting the exchange of oxygen and the removal of product water. If an electrode separator structure of the embodiment is applied to the cathode side, more regions with turbulences would be created when the gas passes through the complicated three-dimensional paths as cathode channels, such as passing through the staggered holes in different porous layers of the embodiment. When a gas flow has higher Reynolds number, it can effectively improve the exchange rate of oxygen and remove water generated within the flow paths during electrochemical reaction, thereby preventing undesired flooding at the cathode channels.

Besides the conductive porous structure 30 depicted in FIG. 3A, the embodiments include other applicable configurations of the conductive porous structures; for example, the shapes and arrangements of the holes of the conductive porous structure can be adequately modified or varied depending on the requirements of the practical applications. The disclosure is not limited to the types depicted in the presented drawings. Four different types of the conductive porous structures in the practical applications are provided below for illustrations.

FIG. 5A-FIG. 5D show four different types of the conductive porous structures of the electrode separator structures according to the embodiments of the disclosure, wherein the holes of the conductive porous structures have one or a combination of a circular shape, an elliptical shape, a polygonal shape and an arbitrary shape. As shown in FIG. 5A-FIG. 5D, each of the conductive porous structure 51/53/55/57 includes two porous layers such as the first porous layer 510/530/550/570 and the second porous layer 520/540/560/580, wherein the first porous layer 510/530/550/570 and the second porous layer 520/540/560/580 respectively includes several first holes 510$h$/530$h$/550$h$/570$h$ and several second holes 520$h$/540$h$/560$h$/580$h$, which are periodically and repeatedly arranged at a plane in parallel to the extending plane (such as XY-plane) of the conductive porous structure 30. Also, the centers of the first holes 510$h$/530$h$/550$h$/570$h$ and the second holes 520$h$/540$h$/560$h$/580$h$ are mutually staggered along a direction (such as Z-direction) vertical to the extending plane (such as XY-plane) of the conductive porous structure. From the appearances of the holes, the lamination of the conductive porous structure can be clearly defined according to the position of the holes, and can be regarded as a structure of a multi-layered stack. Also, there are passages connecting all of the holes, which allows the gas to flow upwardly and downwardly along the direction (such as Z-direction) vertical to the extending plane of the conductive porous structure and to reach a membrane electrode assembly (MEA) of a cell in the application.

Figure 5A:
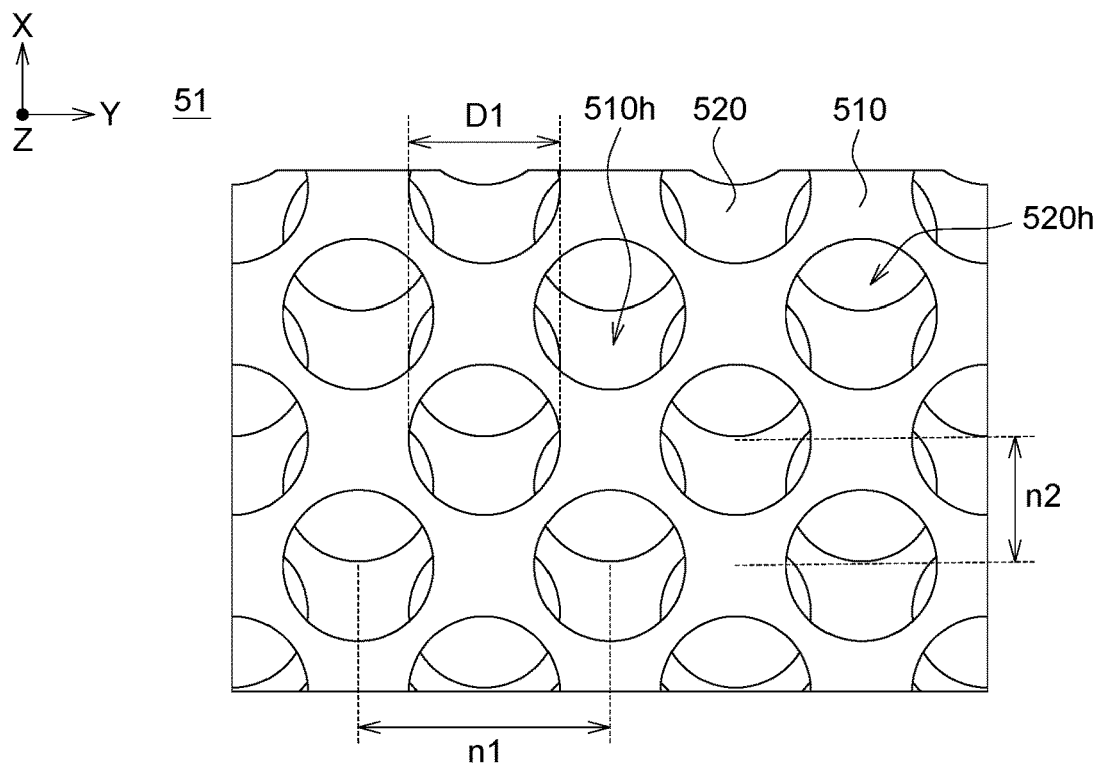
FIG. 5A-FIG. 5D show four different types of the conductive porous structures of the electrode separator structures according to the embodiments of the disclosure.
Figure 5B:
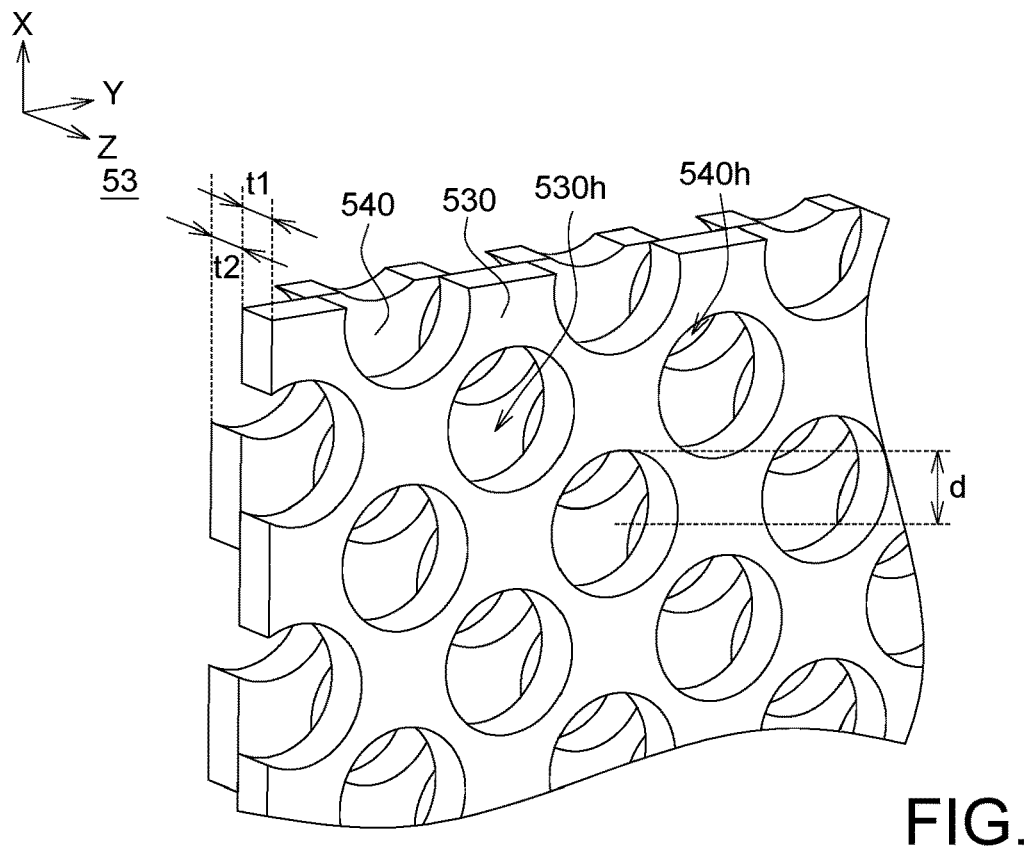
Figure 5C:
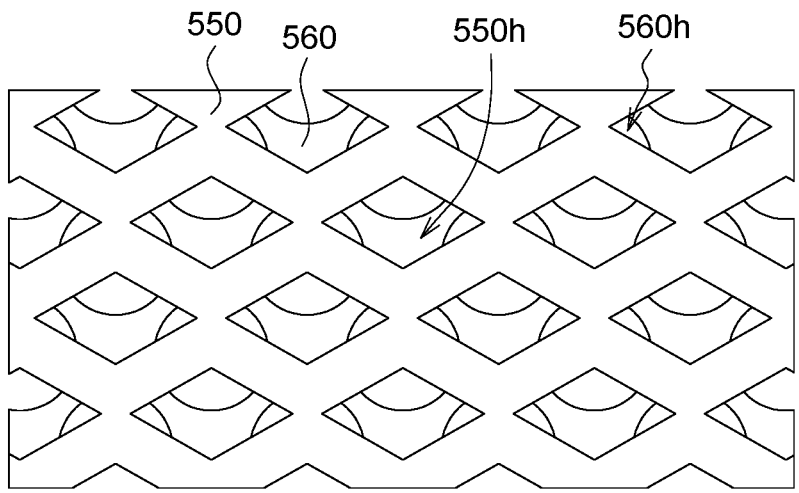
Figure 5D:
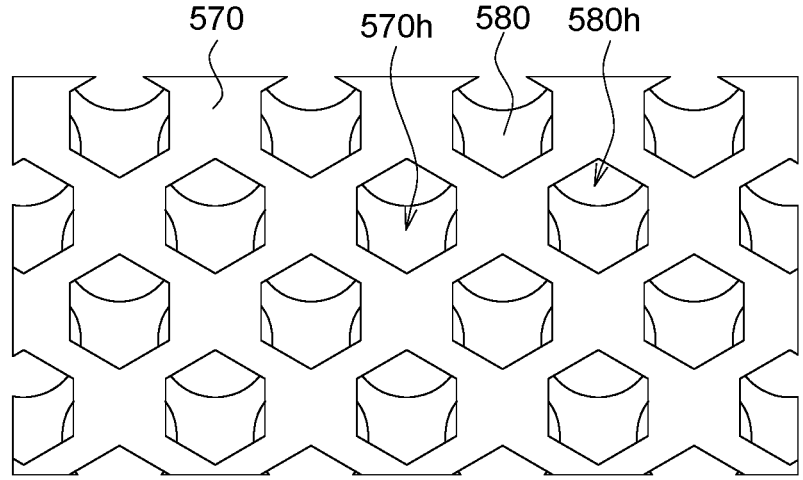

Also, the holes in different porous layers of the conductive porous structure may have the same shape or different shapes. For example, as shown in FIG. 5A and FIG. 5B, the first holes 510$h$/530$h$ in an upper porous layer and the second holes 520$h$/540$h$ in a lower porous layer of the conductive porous structure 51/53 have circular shapes. In another example, as shown in FIG. 5C and FIG. 5D, the second holes 560$h$/580$h$ in the lower porous layer of the conductive porous structure 55/57 have circular shapes, while the first holes 550$h$/570$h$ in an upper porous layer have rhombic and hexagonal shapes, respectively. Moreover, from a top view of the configurations of the embodied conductive porous structures, a hole in the upper porous layer exposes each part of at least two adjacent holes in the lower porous layer. Therefore, through the parts of two of more adjacent holes in the lower porous layer exposed by one hole in the upper porous layer, it not only facilitates the gas flowing upwardly and downwardly along the direction (such as Z-direction) vertical to the extending plane of the conductive porous structure, but also increases the gas flow paths in the lateral directions (such as several directions at the XY-plane) so that the gas passes through the conductive porous structure more efficiently. As shown in FIG. 5B, one of the first holes 530$h$ in the upper porous layer exposes each part of two adjacent second holes 540$h$ in the lower porous layer, which leads the gas to flow upwardly and downwardly, and further to pass through the conductive porous structure along an extending plane of the receiving space via the exposed parts of two of more adjacent holes in the lower porous layer (exposed by the hole in the upper porous layer). As shown in FIG. 5A, FIG. 5C and FIG. 5D, one of the first holes 510$h$/550$h$/570$h$ in the upper porous layer exposes each part of three adjacent second holes 520$h$/560/580 in the lower porous layer, thereby leading the gas to penetrate the holes in different porous layers along not only a vertical direction but also a plane parallel to the conductive porous structure.

In the exemplifications, the holes in the applications may have circular shapes, elliptical shapes, polygonal shapes, or any other arbitrary shapes. Examples of the polygonal shapes include triangles, quadrangles, pentagons, hexagons, etc. The quadrangles includes four-sided polygons, such as squares, rectangles, rhombus, trapezoids, and the objects each shaped with at least two parallel opposite sides. Also, the shape of the hole may be a regular polygon having equal lengths on each side and equal internal angles, including an equilateral triangle, a regular quadrangle, a regular pentagon, a regular hexagon, and the like. Alternatively, the shape of the hole is not limited by the shapes described above, and can be any one or more arbitrary shapes. Accordingly, in one example, the holes of the conductive porous structures may be in the form of a combination of one or more of the aforementioned shapes (such as circular shapes, elliptical shapes, polygonal shapes as defined), or a combination of one or more arbitrary shapes, or a combination of one or more regular and arbitrary shapes. Additionally, if the holes of the conductive porous structures have circular shapes, a diameter of the hole can be determined as a maximum dimension of the hole as aforementioned. If the holes of the conductive porous structures have non-circular shapes, a largest length or width of the hole can be determined as a maximum dimension of the hole, wherein the centers of the holes that are positioned in different layers and communicated with each other are still misaligned according to the designs of the embodiments. Furthermore, material examples of the conductive gas-resistant plate include titanium, stainless steel and other applicable metal materials.

Additionally, the first diameter D1 of the first holes 510$h$ in FIG. 5A can be regarded as a maximum dimension D of the holes. The sizes of the holes can be the same or different. In one example, an average diameter of the holes of the conductive porous structure 30 can be in a range of 0.1 mm to 1.0 mm, and the pitch n1 or n2 between two adjacent holes can be in a range of 0.5 mm to 3 mm. Also, in one example, as shown in FIG. 5B, a central misalignment distance d between two most adjacent holes in different porous layers ranges from $0.5D \leq d < D$, wherein D is a diameter of the hole. Also, in one example, each porous layer of the conductive porous structure 30 has a thickness, such as the thickness t1 or t2 in FIG. 5B, in a range of 0.05 mm to 0.6 mm.

Figure 6A:
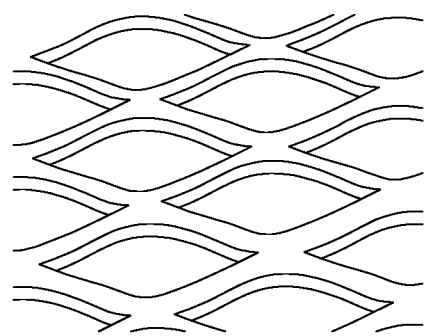
FIG. 6A-FIG. 6C depicts holes of a conductive porous structure manufactured by different methods.
Figure 6B:
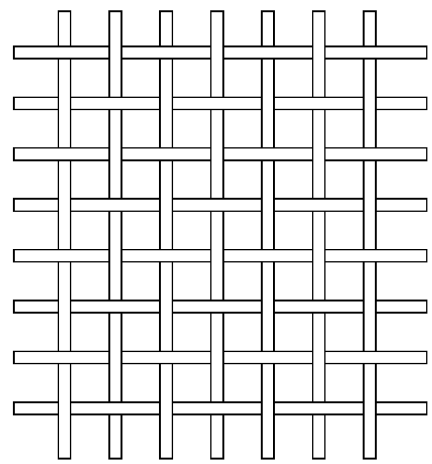
Figure 6C:
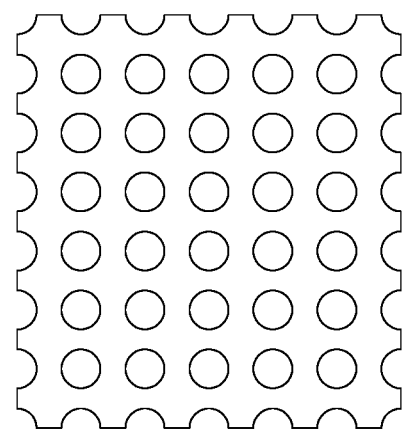

Moreover, the holes of the conductive porous structure can be manufactured, for example, by a method of turning and milling, stamping, etching, weaving, electrical discharge machining, and calendaring molding. FIG. 6A depicts holes of a conductive porous structure manufactured by calendaring molding and etching, wherein the holes have rhombic shapes or hexagonal shapes. FIG. 6B depicts holes of a conductive porous structure manufactured by weaving, wherein the holes have rectangular shapes. FIG. 6C depicts holes of a conductive porous structure manufactured by stamping, turning and milling, wherein the holes have circular shapes. The geometric shapes of the holes would vary depending on the method for manufacturing the holes.

As described above, in actual productions, if the conductive porous structure 30 as shown in FIG. 3A, FIG. 5A-FIG. 5D is a single piece, the holes of the conductive porous structure may be manufactured by double-sided etching, turning and milling, additive manufacturing, or other applicable methods. If the conductive porous structure 30 comprises two or more units assembled to each other as a combination, the units of the conductive porous structure may be assembled by welding, pressing, sintering or other applicable methods, considering the mechanical strength and electrical conductivity of the conductive porous structure. It is, of course, noted that the disclosure has no particular limitation to the methods of manufacturing the conductive porous structure 30/51/53/55/57. Regarding the three-dimensional configuration of the conductive porous structure of the embodiment, those skilled in the machining art can appropriately select or combine the existing processing methods according to the shapes or arrangement of the holes as required in the actual applications. Therefore, the conductive porous structure 30/51/53/55/57 provided in the embodiment makes the design more flexible. Compared to the conventional complicated structure, the conductive porous structure of the embodiments would not be limited by the use of expensive molds and the cost of design change.

Figure 7A:
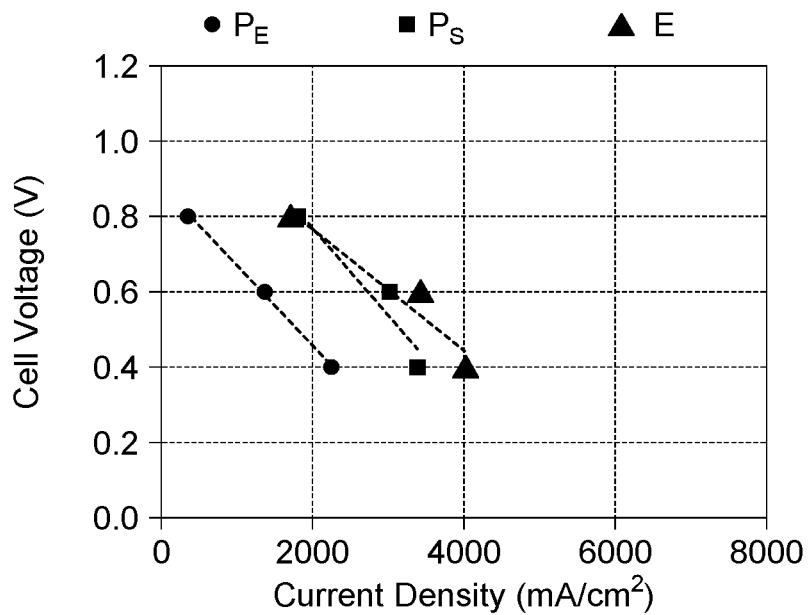
FIG. 7A-FIG. 7C are plots showing results of cell voltage vs. current density for the conventional and embodied single-cell structures under three different inlet conditions.
Figure 7B:
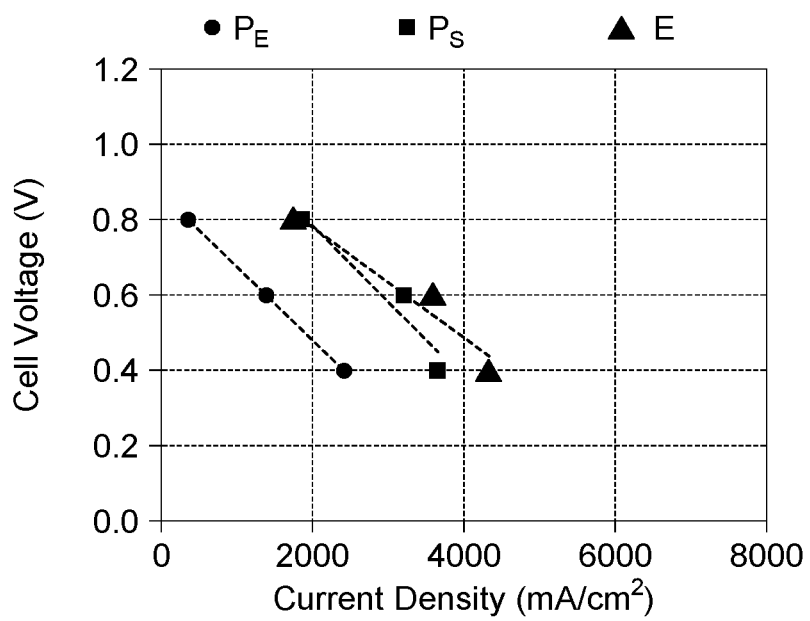
Figure 7C:
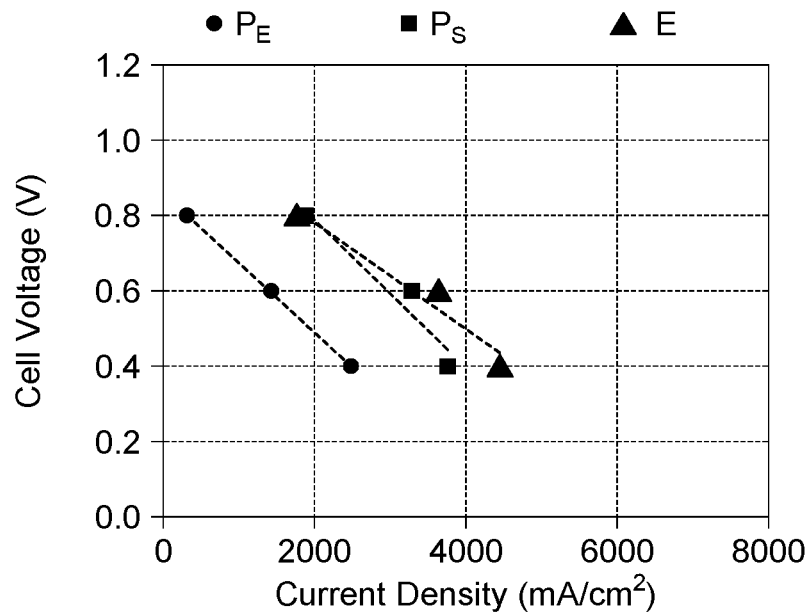

When an electrode separator structure of the embodiment is applied to a cathode electrode separator plate of a fuel cell, the current density of the fuel cell can be increased and the electrochemical reaction of the fuel cell can be improved. FIG. 7A-FIG. 7C are plots showing results of cell voltage vs. current density for the conventional and embodied single-cell structures under three different inlet conditions. In FIG. 7A, the anode inlet temperature, the operation temperature and the cathode inlet temperature are 63° C., 66° C. and 60° C., respectively. In FIG. 7B, the anode inlet temperature, the operation temperature and the cathode inlet temperature are 60° C., 66° C. and 65° C., respectively. In FIG. 7C, the anode inlet temperature, the operation temperature and the cathode inlet temperature are 60° C., 66° C. and 50° C. Additionally, in FIG. 7A-FIG. 7C, the curve $P_E$ represents the experimental values of the cell voltage vs. current density during operation of a conventional single cell structure (e.g. the conventional single cell structure as comparison includes an electrode separator (bipolar plate) structure having serpentine channel as gas flow path); the curve $P_S$ represents the simulated values of the cell voltage vs. current density during operation of the conventional single cell structure; the curve E represents the simulated values of the cell voltage vs. current density during operation of an embodied single cell structure.

As shown in FIG. 7A-FIG. 7C, according to the slopes of the curve $P_E$ (experimental values of conventional serpentine channel) and the curve $P_S$ (simulated values of conventional serpentine channel), it is clearly indicated that although the simulation results need to be corrected in terms of quantification, the qualitative trend is consistent with the trend of experimental results, and this verifies that the simulated numerical model has good reliability for observing the trend of experimental values. Compared results of the curve E (simulated values of the embodiment) with the curve $P_S$ (simulated values of conventional serpentine channel), a fuel cell applied with the electrode separator structure of the embodiment does generate higher current density at the same cell voltage during operation. Thus, compared to the conventional serpentine channel, the electrode separator structure of the embodiment does increase the current density of the fuel cell and improve the electrochemical reaction of the fuel cell when the single cell is operated at a commonly used voltage ranged from 0.7V/cell–0.5V/cell.

Furthermore, electrochemical simulations are conducted to investigate the characteristics of flow channels provided by the electrode separator structure of the embodiment having different material parameters and operated under different operation conditions. For example, the relationship between the porosity of the conductive porous structure and the current density of the cell can be observed, and whether humidity of the cathode inlet has effects on the discharge reaction can also be observed. It is, of course, noted that the contents of the experiments and the simulation results as described hereinafter are provided for illustrations, not provided for limiting the application scopes of the disclosure.

Figure 8:
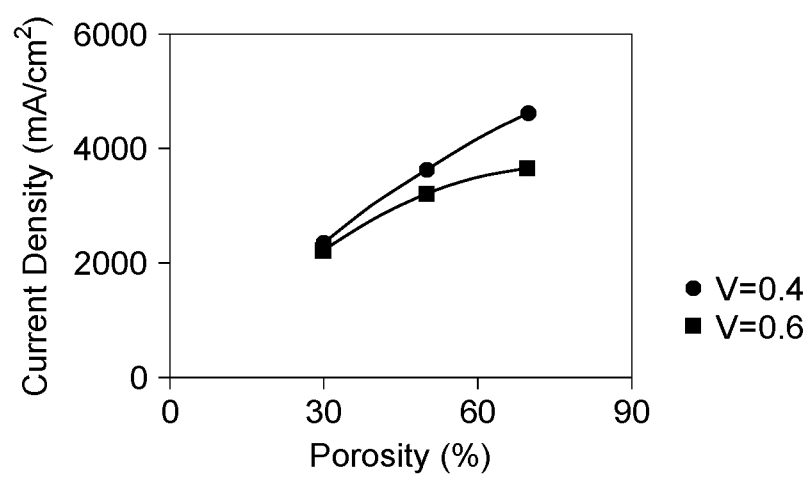
FIG. 8 shows simulation results showing the current density varied with the porosity of the conductive porous structure of the embodiment at cell voltages of 0.4V/cell and 0.6V/cell.

FIG. 8 shows simulation results showing the current density varied with the porosity of the conductive porous structure of the embodiment at cell voltages of 0.4V/cell and 0.6V/cell. The simulation results of FIG. 8 have indicated that the increase of the porosity does improve the current density, that is, the discharge current increases as the porosity increases. However, the current density is approximately saturated at the porosity in a range of 70%-80%. Accordingly, an optimal operation region of a fuel cell applied with the conductive porous structure of the embodiment is obtained under a porosity ranged from 30% to 80%. Moreover, the results in FIG. 8 also indicate that at a cell voltage (operating voltage) of 0.6V/cell, if the porosity is larger than 50%, the improvement of current density converges. Also, at a cell voltage (operating voltage) of 0.4V/cell, the results in FIG. 8 have indicated that the increase in porosity results in a more pronounced improvement in current density. It is noted that the cell voltages (operating voltages) and the porosities in FIG. 8 are provided as an exemplification only, and are not intended to limit the range of applicable cell voltages and porosities when the embodied structure is applied in a fuel cell.

Figure 9A:
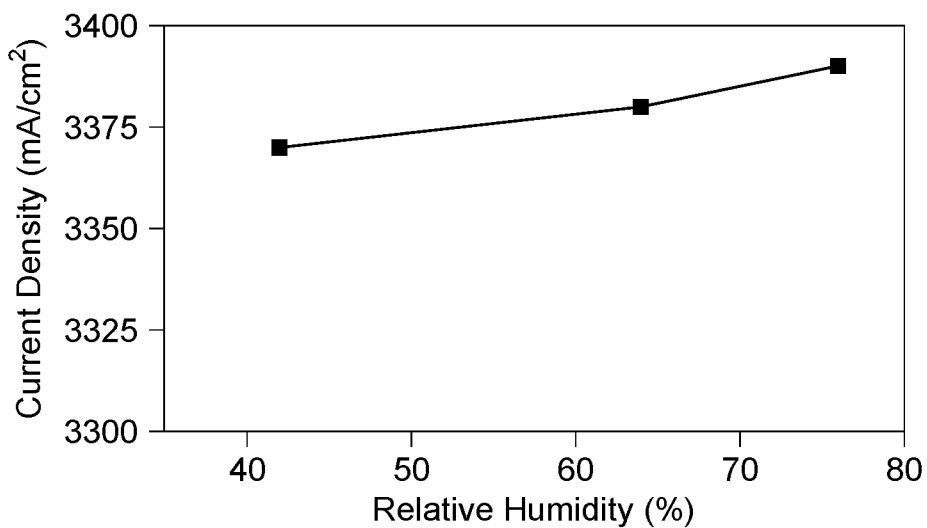
FIG. 9A and FIG. 9B are simulation results showing the current density vs. relative humidity of cathode inlet of the conventional serpentine channel and an embodied conductive porous structure, respectively.
Figure 9B:
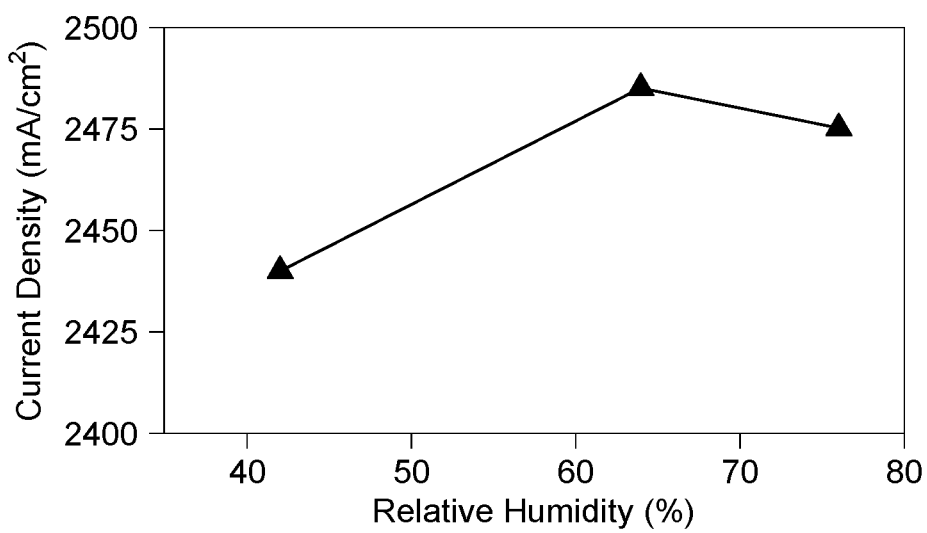

FIG. 9A and FIG. 9B are simulation results showing the current density vs. relative humidity of cathode inlet of the conventional serpentine channel and an embodied conductive porous structure, respectively. The simulation results have clearly indicated that the effect of the relative humidity of the cathode inlet on the current density produced by the embodied conductive porous structure is extremely little. For a structure having the conventional serpentine channel (FIG. 9B), the change in current density value is increased by about 1.5% when the relative humidity increases from 45% to 75%. For the embodied conductive porous structure (FIG. 9A), the change in the current density values is increased by about 0.6% only when the relative humidity increases from 45% to 75%. Therefore, according to the simulation results, the discharge reaction of the embodied conductive porous structure is less sensitive to the change in relative humidity of the cathode inlet than the structure having the conventional serpentine channel. That is, the relative humidity of the cathode inlet almost has no impact on the discharge reaction of the embodied conductive porous structure, which has positive effect on the internal mass transfer of the single cell applied with an embodied conductive porous structure. It is, of course, noted that the numerical values in the drawings (including values of current density and relative humidity) are the values for the illustration only, not for the limitation of the ranges of current density and relative humidity that may be generated in the fuel cell applied with the embodied structures of the disclosure.

Although an electrode separator structure of the embodiment is applied to a cathode electrode separator plate CA of the fuel cell for the illustration, the embodied structure is not limited to be applied in the cathode electrode separator plate only. In practical application, an anode electrode separator plate AN of a fuel cell may include a structure with conventional serpentine channel, or may include an electrode separator structure of the embodiment. The disclosure has no particular limitation to applicable types of the anode electrode separator plates of the fuel cells.

According to the aforementioned descriptions, an electrode separator structure of the embodiment is provided, comprising a conductive gas-resistant plate and a conductive porous structure disposed in a receiving space of the conductive gas-resistant plate. The electrode separator structure of the embodiment can be applied to a cathode electrode separator plate CA of the fuel cell to improve the exchange rate of oxygen and remove water generated within the flow paths at the cathode side during electrochemical reaction, thereby preventing undesired flooding. Compared to a structure having conventional serpentine channel, the electrode separator structure of the embodiment improves the mass transfer of the cathode reactants and eases the impacts of flooding water on the electrochemical reaction of the proton exchange membrane, thereby increasing the current density and improving the electrochemical reaction of the fuel cell in the application.

The structures and experimental contents disclosed above with accompanying drawings are for describing some embodiments or application examples of the present disclosure, and the present disclosure is not limited to the scopes and applications of the above structures and experimental values. In other embodiments with modified structures, known components of different elements still can be adopted, and the exemplified structures can be modified according to the needs in actual applications. Therefore, the structures illustrated in the drawings are for exemplification purpose only, not for limiting the scope of protection of the present disclosure. Anyone skilled in the technology field of the disclosure will be able to make suitable modifications or changes based on the relevant structures of the present disclosure to meet the needs in actual applications.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electrode separator structure, comprising:
   a conductive gas-resistant plate, having a receiving space and at least a set of an inlet port and an outlet port, wherein at least the set of the inlet port and the outlet port have passages respectively communicating the receiving space; and
   a conductive porous structure, disposed in the receiving space and communicating with at least the set of the inlet port and the outlet port to form reaction gas flow paths, wherein the conductive porous structure comprises a plurality of holes laminated as at least two porous layers, and the at least two porous layers are laminated in a staggered arrangement along a direction vertical to an extending plane of the conductive porous structure such that a gas is allowed to flow along the direction vertical to the extending plane of the conductive porous structure by the staggered arrangement between the holes of different porous layers.

2. The electrode separator structure according to claim 1, wherein the conductive gas-resistant plate comprises a plurality of sets of the inlet ports and the outlet ports, and the plurality of sets of the inlet ports and the outlet ports have a plurality of the passages respectively communicating the receiving space.

3. The electrode separator structure according to claim 1, wherein most adjacent two of the plurality of holes in different layers of the at least two porous layers are staggered from each other by a central misalignment distance d, and one of the most adjacent two of the plurality of holes has a maximum dimension D, wherein $0.5D \leq d < D$.

4. The electrode separator structure according to claim 1, wherein the at least two porous layers are parallel to the extending plane of the conductive porous structure, and the plurality of holes are periodically and repeatedly arranged to form an array.

5. The electrode separator structure according to claim 1, wherein the plurality of holes of the at least two porous layers are communicated with each other.

6. The electrode separator structure according to claim 1, wherein a porosity of the conductive porous structure is in a range of 30% to 80%.

7. The electrode separator structure according to claim 1, wherein an average diameter of the plurality of holes of the conductive porous structure is in a range of 0.1 mm to 1.0 mm.

8. The electrode separator structure according to claim 1, wherein the plurality of holes of the conductive porous structure have one or a combination of a circular shape, an elliptical shape, a polygonal shape and an arbitrary shape.

9. The electrode separator structure according to claim 1, wherein the conductive porous structure comprises at least two units assembled to each other, and the at least two units are a first porous layer and a second porous layer.

10. A fuel cell, comprising an anode electrode separator plate, a cathode electrode separator plate and a membrane electrode assembly disposed between the anode electrode separator plate and the cathode electrode separator plate, wherein the cathode electrode separator plate comprises the electrode separator structure according to claim 1.

* * * * *